US009660817B2

(12) United States Patent
Saboori et al.

(10) Patent No.: US 9,660,817 B2
(45) Date of Patent: *May 23, 2017

(54) ADVISING CLIENTS ABOUT CERTIFICATE AUTHORITY TRUST

(71) Applicant: Microsoft Corporation, Redmond, WA (US)

(72) Inventors: Anooshiravan Saboori, Seattle, WA (US); Muhammad Umar Janjua, Bellevue, WA (US); Nelly Porter, Kirkland, WA (US); Philip Hallin, Port Townsend, WA (US); Haitao Li, Sammamish, WA (US); Xiaohong Su, Sammamish, WA (US); Kelvin Yiu, Bellevue, WA (US); Anthony Paul Penta, Bellevue, WA (US); Vassil Dimitrov Bakalov, Redmond, WA (US); Bryston Mitsuo Nitta, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 49 days.

This patent is subject to a terminal disclaimer.

(21) Appl. No.: 14/449,684

(22) Filed: Aug. 1, 2014

(65) Prior Publication Data

US 2016/0036593 A1    Feb. 4, 2016

Related U.S. Application Data

(63) Continuation of application No. 14/020,491, filed on Sep. 6, 2013.

(Continued)

(51) Int. Cl.
*H04L 29/06* (2006.01)
*H04L 9/32* (2006.01)

(52) U.S. Cl.
CPC ............ *H04L 9/3268* (2013.01); *H04L 9/321* (2013.01); *H04L 9/3263* (2013.01); *H04L 9/3265* (2013.01); *H04L 63/0823* (2013.01)

(58) Field of Classification Search
CPC .............. H04L 63/0823; H04L 9/3294; H04L 63/0442; H04L 9/3268; H04L 9/321; H04L 9/3263; H04L 9/3265
See application file for complete search history.

(56) References Cited

U.S. PATENT DOCUMENTS 6,148,083 A * 11/2000 Fieres .................. G06F 21/602
                                                       380/255
7,058,619 B2    6/2006 Wanish
(Continued)

OTHER PUBLICATIONS

Pre-Interview Office Action in U.S. Appl. No. 14/020,491 dated Feb. 6, 2015, 7 pgs.
Reply Pre-Interview Office Action in U.S. Appl. No. 14/020,491 dated Apr. 6, 2015, 13 pgs.
Non-Final Office Action in U.S. Appl. No. 14/449,716 dated Apr. 1, 2015, 33 pgs.

(Continued)

*Primary Examiner* — Carl Colin
*Assistant Examiner* — Ghodrat Jamshidi
(74) *Attorney, Agent, or Firm* — Cooper Legal Group, LLC

(57) ABSTRACT

In many information security scenarios, a certificate issued by a certificate authority may be presented to a client in order to assert a trust level of a certificated item, such as a message or a web page. However, due to a decentralized structure and incomplete coordination among certificate authorities, the presence and exploitation of security vulnerabilities to issue untrustworthy certificates may be difficult to determine, particularly for an individual client. Presented herein are techniques for advising clients of the reputations of respective certificate authorities by evaluating the certificates issued by such certificate authorities, such as the number and types of domains certified by the certificate; the number and pattern of certificates issued for the domain; and (Continued)

the certification techniques used to issue the certificates. Such evaluation enables a determination of a certificate authority trust level that may be distributed to the clients in a certificate authority trust set.

20 Claims, 8 Drawing Sheets

Related U.S. Application Data

(60) Provisional application No. 61/830,121, filed on Jun. 2, 2013.

(56) References Cited

U.S. PATENT DOCUMENTS

| | | | |
|---|---|---|---|
| 8,214,634 B1 | 7/2012 | Steele et al. | |
| 8,327,128 B1* | 12/2012 | Prince | H04L 63/0823 713/150 |
| 8,341,399 B2 | 12/2012 | Brown et al. | |
| D702,253 S | 4/2014 | Kotler et al. | |
| 9,077,546 B1 | 7/2015 | Rakshit | |
| 2002/0078347 A1* | 6/2002 | Hericourt | H04L 9/3263 713/156 |
| 2003/0018585 A1 | 1/2003 | Butler et al. | |
| 2003/0182549 A1 | 9/2003 | Hallin et al. | |
| 2005/0080899 A1 | 4/2005 | Vogel et al. | |
| 2006/0015729 A1* | 1/2006 | Novack | H04L 63/0823 713/173 |
| 2008/0028443 A1 | 1/2008 | Adelman et al. | |
| 2008/0232583 A1* | 9/2008 | Di Crescenzo | H04L 9/002 380/44 |
| 2012/0216035 A1* | 8/2012 | Leggette | G06F 3/0614 713/157 |
| 2012/0284508 A1* | 11/2012 | Zaverucha | H04L 9/3263 713/156 |
| 2013/0014020 A1 | 1/2013 | Dixon et al. | |
| 2013/0061281 A1 | 3/2013 | Pao et al. | |
| 2014/0237091 A1 | 8/2014 | Sabin et al. | |

OTHER PUBLICATIONS

Reply Non-Final Office Action in U.S. Appl. No. 14/449,716 dated Jul. 1, 2015, 16 pgs.
Int. Search Report in PCT Application No. PCT/US2013/061082 dated Jan. 20, 2014, 11 pgs.
"A Formal Model of Trust for Calculating the Quality of X.509 Certificate", Wazan Ahmad Samer, Laborde Romain, Barrere Francois, Benzekri Abdel Malek, May 5, 2010, Sec urity and Comunication Networks, vol. 4, Issue 6, 57 pgs.
"Use of a Valifation Authority to Provide Risk Management for the PKI Relying Party", 2006, Jon Olnes and Leif Buene, Public Key Infrastructure, Lecture Notes in Computer Science vol. 4043, 15 pgs.
"What Are CA Certificates?", Published on: Jul. 26, 2011, pp. 10 Available at: http://technet.microsoft.com/en-us/library/cc778623(v=ws.10).aspx.
Laurie, et al., "Certificate Transparency", In Network Working Group, Internet-Draft, Apr. 18, 2013, 34 pages, http://tools.ietf.org/pdf/draft-laurie-pki-sunlight-12.pdf.
"ImperialViolet", Published on: May 4, 2011, pp. 2 Available at: http://www.imperialviolet.org/2011/05/04/pinning.html.
"Certificate Patrol", Retrieved on: May 16, 2013, pp. 9 Available at: http://patrol.psyced.org/.
Soghoian, et al., "Certified Lies: Detecting and Defeating Government Interception Attacks Against SSL", In Proceedings of the 15th International Conference on Financial Cryptography and Data Security, Feb. 28, 2011, 20 pages, http://files.cloudprivacy.net/ssl-mitm.pdf.
Non-Final Office Action in U.S. Appl. No. 14/020,491 dated Nov. 27, 2015, 31 pgs.
Reply Final Office Action in U.S. Appl. No. 14/449,716 dated Dec. 3, 2015, 20 pgs.
Final Office Action in U.S. Appl. No. 14/020,491 dated Apr. 30, 2015, 23 pgs.
Reply Final Office Action in U.S. Appl. No. 14/020,491 dated Oct. 30, 2015, 21 pgs.
Final Office Action in U.S. Appl. No. 14/449,716 dated Jul. 16, 2015, 32 pgs.

* cited by examiner

ADVISING CLIENTS ABOUT CERTIFICATE AUTHORITY TRUST

CROSS-REFERENCE TO RELATED APPLICATIONS

The present application claims priority to U.S. patent application Ser. No. 14/020,491, filed Sep. 6, 2013, which in turn claims priority to U.S. Patent Application No. 61/830,121, filed Jun. 2, 2013, the entirety of which are hereby incorporated by reference.

BACKGROUND

Within the field of computing, many scenarios involve authentication using a certificate issued by a certificate authority. For example, a user may connect to a website to perform a sensitive interaction, such as a financial transaction, using credentials that might be misused if intercepted by a third party. Accordingly, the website may submit a certificate verifying its identity and signed by a certificate authority. The device of the user may examine the cryptographic signatures of the certificate to verify its authenticity that the identity of the issuer and the authenticity of the certificate before proceeding with the transaction and the provision of credentials.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The certificate authority system is subject to exploitation due to a variety of technical and non-technical aspects. As a first example, vulnerabilities may be discovered and exploited in the mathematical models on which security techniques are based; e.g., flaws in the MD5 hashing algorithm may permit the forgery of certificates or the alteration of signed content. As a second example, under the current certification model, a set of certificate authorities is identified and globally trusted, such that any certificate authority may issue certificates for any domain; as a result, the exploitation, coercion, or malicious actions of any one certificate authority may result in the issuance of inauthentic certificates for any domain. As a third example, it may be difficult to detect exploits of certificate authorities, particular certificates, and the security models involved therein, because relevant information may be withheld (e.g., certificate authorities often do not provide public records of issued certificates and/or currently utilized security techniques), and/or may be unable to assess outside of a collective process that currently does not exist (e.g., some types of exploits may be apparent from a collection of certificates submitted to a variety of users, but may be undetectable from individual certificates).

In view of these limitations, the present disclosure involves a collective model for evaluating certificates issued by certificate authorities for respective domains. In accordance with this model, a certificate authority trust service may collect a set of certificates (e.g., from the web browsers of individual users, and/or a trusted set of domain crawlers that crawl the internet and accept certificates) that have been issued by certificate authorities for respective domains. The certificate authority trust service may evaluate the certificates using a variety of factors, such as the number and pattern of times that the certificate has been received; conflicts between the certificate and other certificates issued by the certificate authority for the domain; the sequence of certificate authorities back to a root certificate authority; the content type of the domain for which the certificate has been issued; and the certification techniques utilized by the certificate authority to issue the certificate (e.g., whether an encryption or hashing algorithm used for the certificate has known vulnerabilities that may enable forgery or alteration). Such factors may enable a determination of the trustworthiness of the certificate authority and/or the exploitation of vulnerabilities in certificating security techniques. Based on these determinations, the certificate authority trust service may generate a certificate authority trust set indicating the current trust level of various certificate authorities, and may disseminate the certificate authority trust set to a set of devices, such as a set of web browsers. The devices may then evaluate any subsequently received certificate, issued by a certificate authority on behalf of a particular domain, in view of the trust level of the certificate authority indicated by the certificate authority trust set. In this manner, the techniques presented herein may enable the devices to evaluate the trust of certificates using collective information in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
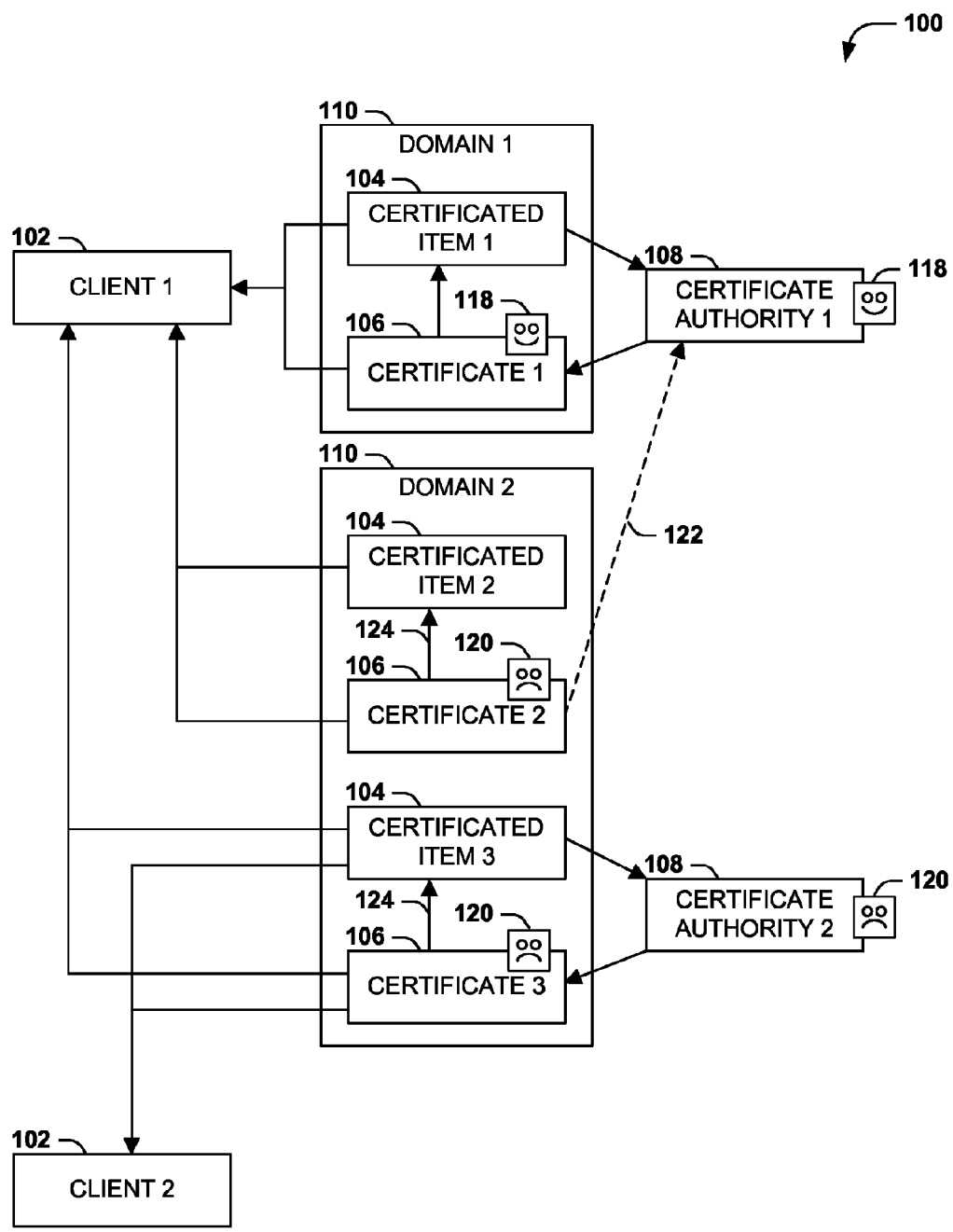
FIG. 1 is an illustration of an exemplary scenario featuring a set of certificate authorities issuing certificates for certificated items to clients.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an exemplary scenario 100 featuring a set of certificate authorities 108 issuing certificates 106 to various clients 102. In this exemplary scenario 100, a first client 102 by communicating over a network (a cellular network or the Internet) may request a certificated item 104 from a first domain 110 of the network. The first client 102 may endeavor to verify the authenticity of the certificated item 104, e.g., verification that the certificated item 104 has not been altered by the domain 110 or a third party, and/or verification that the domain 110 with which the client 102 is communicating is a party known to the first client 102 and not being impersonated by a third party, such as in a "man-in-the-middle" attack. For example, the client 102 may communicate with a trusted third party via messages stored on an intermediary message server that the first client 102 and/or the third party does not completely trust, and the first client 102 may seek assurance that the domain 110 with which the client 102 is communicating is the intermediary message server, and that the messages provided by the intermediary message server have not been altered since authorship by the third party.

In order to provide such verification, a first certificate authority 108 may be provided that has established a level of trust with the first client 102. The first certificate authority 108 may generate a first certificate 106 identifying one or more aspects of the identity of the first domain 110 and/or the certificated item 104 (e.g., a hashcode of the content of a message), and cryptographically signed with a credential of the first certificate authority 108 (e.g., using a cryptographic private key of an asymmetric encryption technique). The first certificate authority 108 may then provide the first certificate 106 for the certificated item 104 to the first domain 110, which may, in turn, provide the first certificate 106 with the first certificated item 104 to the first client 102. Upon receiving the certificate 106 with the certificated item 104, the first client 102 may authenticate the first certificate 106 with a credential of the first certificate authority 108 (e.g., verifying the signature of the first certificate 106 with a cryptographic public key of the first certificate authority 108), and may compare the first certificate 106 with the certificated item 104 (e.g., comparing a hashcode of the content of the certificated item 104 with the hashcode recorded in the first certificate 106). Verification of the first certificate 106 with the credential of the first certificate authority 108 establishes a trustworthiness 118 of the first client 102 in the authenticity of the first certificate 106 (e.g., that the first certificate 106 was actually generated by the first certificate authority 108 and not a third party, and that the first certificate 106 has not been altered subsequent to generation), and an accurate comparison of the first certificate 106 with the first certificated item 104 enables a trustworthiness 118 of the first client 102 in the authenticity of the first certificated item 104 (e.g., that the first certificated item 104 has not been altered since it was presented to the first certificate authority 108 for certification). In this manner, trustworthiness 118 in certificated items 104 may be established on behalf of clients 102 by certificate authorities 108, even if such certificated items 104 and certificates 106 are handled by untrusted intermediaries.

In view of these techniques, a body of certificate authorities 108 may be created according to a set of security practices. Occasionally, exploits in the body of certificate authorities 108 may prompt changes to the structure and underlying security techniques of such certificate authorities 108. For example, vulnerabilities may be occasionally discovered in some of the mathematical techniques used in certificate generation that enable an attacker to alter the contents of the certificates 106 issued by certificate authorities 108. For instance, the hashing algorithm identified as MD5 was regarded as applicable to a particular set of content with a cryptographic private key, resulting in a hashcode for the content of a certificated item 104 that is verifiable with the corresponding cryptographic public key, that enables the detection of alterations to the signed content, and that cannot be generated without possessing the cryptographic private key corresponding to the cryptographic public key. However, flaws discovered in the mathematical techniques comprising the MD5 hashing algorithm may be exploited to allow the generation of certificates 106 without possession of the cryptographic private key, and/or the adjustment of a validly generated hashcode in a manner that verifies against altered content. While such exploits may be computationally very difficult, the feasibility of generating hashcodes for forged or altered certificates 106 has prompted a revocation of public trust in the MD5 hashing algorithm, and has prompted certificate authorities 108 to shift security practices in the generation of certificates 106 from using the MD5 hashing algorithm to other hashing algorithms (such as SHA-2) that are not currently known to present mathematical flaws or vulnerabilities.

However, difficulties in this technique may arise from a decentralized body of certificate authorities 108. For example, certificate authorities 108 may operate independently, and may not uniformly agree about the selection and implementation of security practices to be used in generating certificates 106. Accordingly, a first certificate authority 108 may use a security practice (such as a particular hashing algorithm) that a second certificate authority 108 considers unsecure. Additionally, incomplete disclosure by a particular certificate authority 108 of the security practices utilized in generating certificates 106 (e.g., policies for rotating certificating credentials) may cause difficulty in assessing the certificate authority trust level 212 of the certificate authority 108 according to the authenticity of its certificates 106. Accordingly, a lack of collective evaluation of trust in certificate authorities 108 may inhibit the evaluation of the certificate authority trust level 212. For example, a particular client 102 presented with a certificate 106 may have limited access to information as to the certificate authority trust level 212 to be ascribed to the certificate authority 108 in view of the certificate 106, and may therefore be unable to authenticate the certificate 106 beyond the content thereof. Additionally, diagnostic information pertaining to the certificate authority trust level 212 of certificate authorities 108 may be apparent in patterns of activity in the issuance of a variety certificates 106 by the certificate authority 108 to a variety of clients 102, but the evaluation of such information may be inhibited by the unavailability of mechanisms for collecting and evaluating the certificates 106 issued by the certificate authority 108 and received by a variety of clients 102.

Accordingly, the certificate authority trust level 212 to be placed in certificate authorities 108 may be subject to exploitation that may be difficult to detect. As a first such example, in some certificate authority scenarios, any certificate authority 108 may issue a public certificate for any domain 110. The certificate authority trust level 212 of the certificate authority system may thus be subject to exploitation; e.g., certificates 106 ostensibly representing a first entity (such as a first company or a first national government) may be issued by a certificate authority 108 that is collaborating with an adverse second entity (such as a competing company or a hostile second national government). As a second such example, because certificate authorities 108 may not provide public records of the certificates 106 issued on behalf of various domains 110, it may be difficult for a domain 110 to detect the issuance of unauthorized certificates on its behalf. As a third such example, it may be difficult to review the security practices utilized by a particular certificate authority 108; e.g., some certificate authorities 108 may be slow or reluctant to transition away from using security practice that is found to be unsecure. As a fourth such example, some types of exploits may be detectable only by a collective evaluation of many certificates; e.g., the issuance of certificates on behalf of a particular domain 110 concurrently by two or more different certificate authorities 108 may raise a security concern, but the detection of this condition may be difficult to discern from the examination of any particular certificate 106 in isolation. Moreover, due to the absence of a collective process to gather, examine, reach a consensus on, and disseminate information about the trust placed in respective certificate authorities makes it difficult for any particular client 102 to determine whether or not to determine the certificate authority trust level 212 of a particular certificate authority 108, and the authenticity of a certificate 106 issued by the certificate authority 108 for a particular domain 110.

Such problems are further illustrated in the exemplary scenario 100 of FIG. 1. As a first such example, the first client 102 may receive from a second domain 110 a second certificate 106 that is associated 124 with a second certificated item 104, and that indicates issuance by the first certificate authority 108. However, the second certificate 106 may not have been issued by the first certificate authority 108, but may instead have been forged 122 (e.g., by the second domain 110 or a third party) through the exploitation of a security vulnerability (e.g., the use of a compromised credential of the first certificate authority 108). Accordingly, it may be desirable for the client 102 to identify an untrustworthiness 120 of the second certificate 106, but the first client 102 may not be able to determine such untrustworthiness 120 simply by examining the second certificate 106. As a second example, a second certificate authority 108 that exhibits untrustworthiness 120 (e.g., a history of issuing improper certificates 106) may issue a third certificate 106 for a third certificated item 104, and the third certificate 106 may be submitted to the first client 102. However, even if the first client 102 is able to determine the untrustworthiness 120 of the third certificate 106 issued by the second certificate authority 108, such determination of untrustworthiness 120 may not be communicated to a second client 102, which, upon receiving the third certificate 106, may incorrectly determine a certificate authority trust level 212 of the second certificate authority 108. Due to these aspects illustrated in the exemplary scenario 100 of FIG. 1 and other aspects of a system of certificate authorities 108, determinations of certificate authority trust level 212 of respective certificate authorities 108 may be difficult.

B. Presented Techniques

Presented herein are techniques that may enable a reduction or avoidance of exploitable vulnerabilities that may arise within a system of certificate authorities 108. In accordance with these techniques, a certificate authority trust service may be devised that collects certificates 106 that have been presented to clients 102 for the authentication of various certificated items 104. For example, the devices utilized by a set of users may automatically submit some received certificates 106 to a certificate authority trust service. Alternatively or additionally, a certificate authority trust service may utilize a set of trusted clients 102 (e.g., a trusted set of crawlers) that automatically explore a set of domains 110 and collect certificates 106 submitted by the domains 110 and apparently issued by a certificate authority 108. Based on the evaluation of the respective certificates 106, the certificate authority trust service 202 may generate a certificate authority trust set indicating a certificate authority trust level 212 for respective certificate authorities 108, and may distribute the certificate authority trust set to a set of clients 102. Each client 102 may then evaluate subsequently received certificates 106 based on the certificate authority trust level 212 of the certificate authority 108 issuing the certificate 106 as indicated by the certificate authority trust set, as well as various other heuristics for assessing the trust of a certificate 106. These and other techniques may be utilized to detect, disseminate, and utilize a collective certificate trust evaluation process in accordance with the techniques presented herein.

Figure 2:
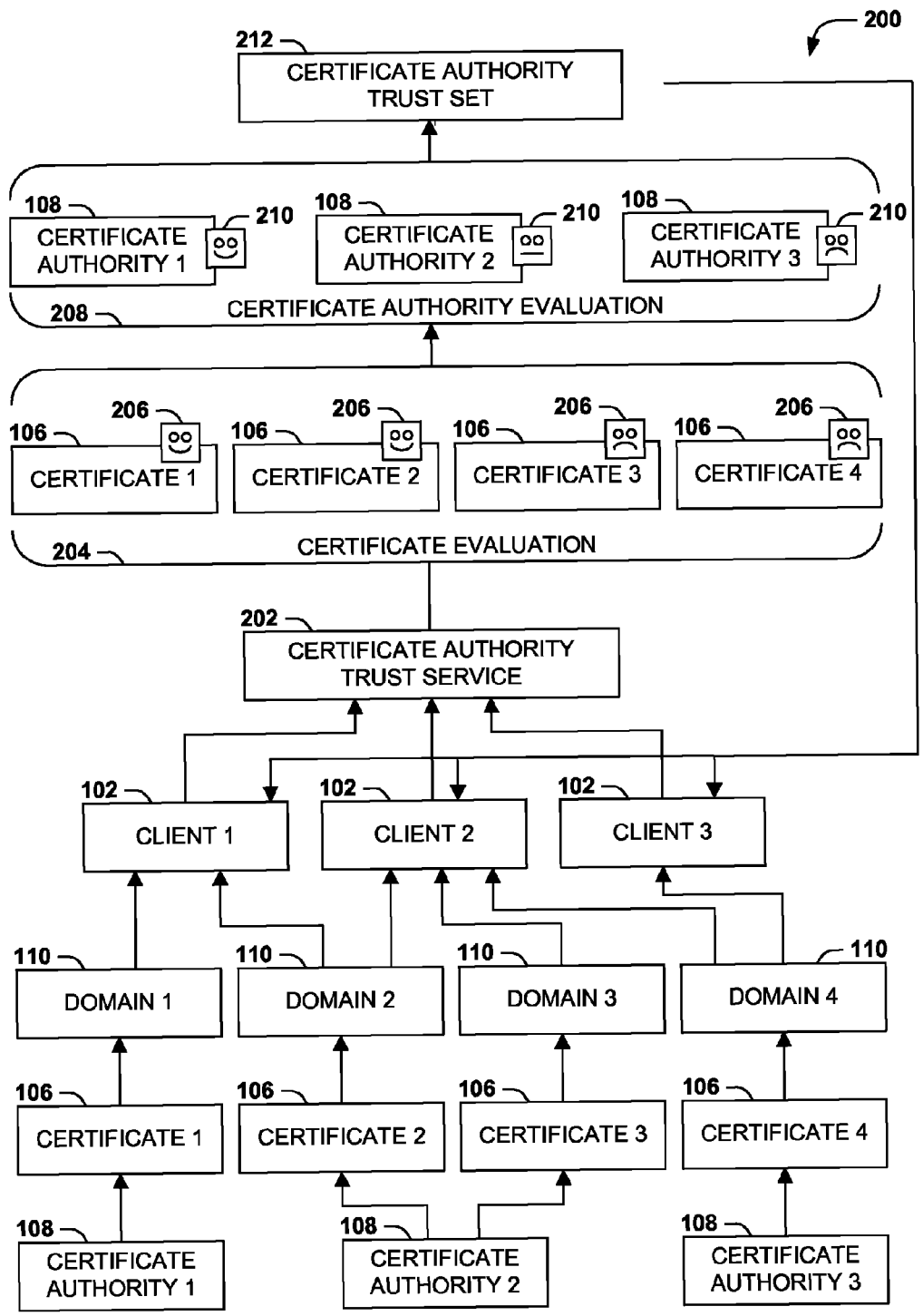
FIG. 2 is an illustration of an exemplary scenario featuring a certificate authority trust service facilitating clients in evaluating certificates received from certificate authorities in accordance with the techniques presented herein.

FIG. 2 presents an illustration of an exemplary scenario 200 featuring the collective evaluation of trust levels of various certificate authorities 108 by a certificate authority trust service 202. In this exemplary scenario 200, a set of certificate authorities 108 issues a set of certificates 106 for various certificated items 104 (e.g., the content of a message or a web page, or an identifying credential of a domains 110 such as a website), and the certificates 106 are presented to a set of clients 102 (e.g., directly by the certificate authorities 108, through another client 102, or indirectly by a domain 110 of a network). The clients 102 in turn send the certificates 106 (optionally including an identifier of the certificated item 104 and/or the domain 110 presenting the certificate 106 to the client 102) to the certificate authority trust service 202.

The certificates 106 collected from various domains 110 may be evaluated to evaluate a certificate authority trust level 212 of the certificate authorities 108, using a variety of heuristics. As a first such example, the certificate authority trust service 202 may consider the number and pattern of times that the certificate 106 has been received from clients 102, e.g., whether the certificate 106 is new, established, or expired, and whether the certificate 106 has reappeared after a lapse in submissions by clients 102. As a second such example, the certificate authority trust service 202 may consider conflicts between the certificate 106 and other certificates 106 issued by the certificate authority 108 for a particular domain 110, such as a receipt of a second certificate 106 for a domain 110 while a prior certificate 106 for the same domain 110 remains in effect and unrevoked. As a third such example, a sequence of certificate authorities 108 back to a root certificate authority may be evaluated; e.g., if any of the certificate authorities 108 in the sequence by which a certificate 106 was issued has been compromised, the certificate 110 may be regarded as suspicious even if the other certificate authorities 108 have not been compromised. As a fourth such example, the content type of the domain 110 for which the certificate 106 has been issued; e.g., if the domain 110 is from a particular geographic region that is unusual for the certificate authority 108, or if the domain 110 hosts content that is unusual for the certificate authority 108 to certify (e.g., malware), the certificate 106 may be regarded as suspicious. As a fourth such example, if the certificate 106 was generated using a certification technique, such as an encryption or hashing algorithm, that has a known vulnerability and that may enable forgery or alteration, the certificate 106 may be regarded as suspicious.

The certificate authority trust service 202 also performs a certificate authority evaluation 208 of the respective certificate authorities 108 based on the certificate trust levels 206 of the certificates 106 that appear to have been issued by that certificate authority 108, and determines a certificate authority trust level 210 of the certificate authority 108. For example, a first certificate authority 210 issuing only certificates 108 having a high certificate trust level 206 (e.g., certificates 108 that present no indication of suspicion or forgery) may be assigned a positive certificate authority trust level 210; a second certificate authority 108 issuing a second certificate 106 having a high certificate trust level 067 and a third certificate 106 having a poor certificate trust level 206 (e.g., a detected forgery of the issuance of the third certificate 206) may be assigned an intermediate certificate authority trust level 210; and a third certificate authority 108 associated with several certificates 106 having a negative certificate trust level 206 may be assigned a negative certificate authority trust level 210. The certificate authority trust service 202 then generates a certificate authority trust set 212 identifying, for respective certificate authorities 108, a certificate authority trust level 210. The certificate authority trust service 202 sends the certificate authority trust set 212 to the clients 102, which may utilize the certificate authority trust set 212 to determine a certificate authority trust level 212 to be ascribed to the respective certificate authorities 108; upon receiving a certificate 106 for a certificated item 104, a client 102 may ascribe to the certificate 106 and the certificated item 104 a trust level proportional to a certificate authority trust level 212 of the certificate authority 108 apparently issuing the certificate 106. In this manner, the clients 102 and certificate authority trust service 202 may interoperate to achieve a collaborative collection, determination, and dissemination of certificate authority trust levels 212 of various certificate authorities 108 and certificates 106 issued thereby in accordance with the techniques presented herein.

C. Technical Effects

The techniques presented herein enable a variety of technical effects that may benefit the operation of devices configured according to such techniques.

As a first such example, a device utilizing the techniques presented herein may automatically advise other devices as to the reliability of certificates 106 and certificate authorities 108. The use of a device, such as a server, to achieve such detection may alleviate humans, such as security researchers, from manually reviewing such certificates 106 and making determinations of the certificate authority trust level 210 of respective certificate authorities 108. Additionally, using a device, such as a server, to perform such evaluation may promote the consistency of such determinations; e.g., using a single device that consistently applies a set of heuristics to a large number of certificates 106 enables more consistent security determinations than having a team of humans evaluate such certificates 106 individually and subjectively, and therefore possibly inconsistently, perform such evaluation.

As a second such example, a device utilizing the techniques presented herein may detect more subtle patterns among certificates 106, domains 110, and certificate authorities 108 than a human reviewer may detect and observe. As a first such example, an established certificate 106 may present no apparent signs of suspicion to a human reviewer, but an automated evaluation technique may detect that the certificate 106 has not been received from any clients 102 for an unusual amount of time (e.g., heavy use by the domain 106, a six-month period wherein no clients 102 submit the certificate 106 to the certificate authority trust service 202, followed by a sudden reappearance of the certificate 106). As a second such example, a certificate 106 by a certificate authority 108 may represent a minor problem that raises only a low degree of suspicion, but may be one of many such certificates 106 issued by the same certificate authority 108 that raise only a low degree of suspicion, where a detected pattern of consistently low suspicion may indicate an aggregate greater level of suspicion of the certificate authority 108.

As a third such example, a device utilizing the techniques presented herein may respond more rapidly to suspicious certificates and vulnerabilities than a human-mediated review process. For example, if a certificating authority begins issuing unambiguously forged certificates on behalf of a collection of domains, an automated review technique may rapidly flag the certificate authority 108 as having been compromised and may rapidly notify a large body of clients 102 of a reduction of the certificate authority trust level 210 of the certificate authority 108, rather than waiting for a human to review the certificates and authorize the reduction of the certificate authority trust level 210. Such automated techniques therefore considerably reduce the window of opportunity for a compromised certificate authority 108 to exploit forged certificates 106. These and other technical effects are achievable through the use of the techniques presented herein.

D. Exemplary Embodiments

Figure 3:
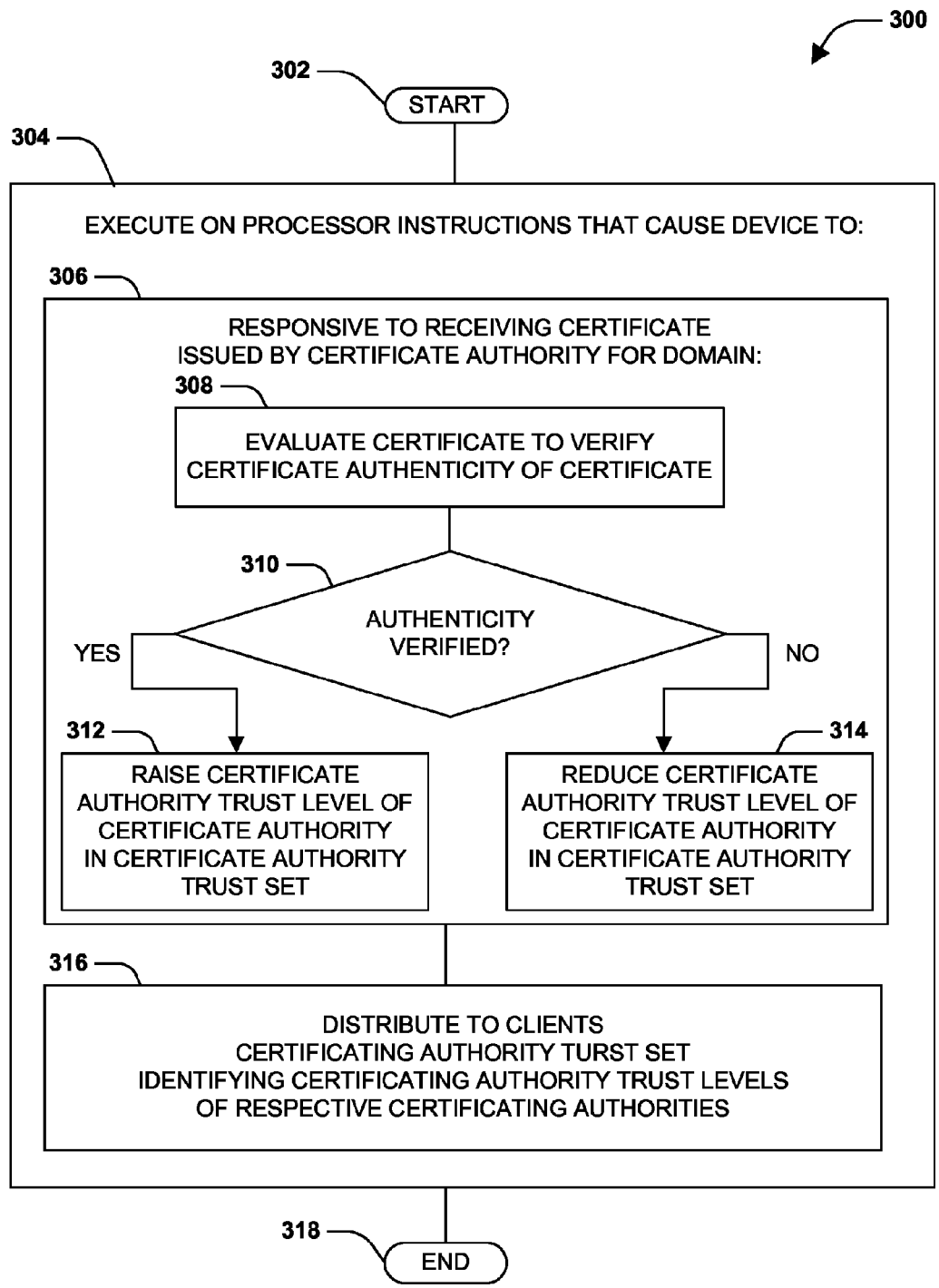
FIG. 3 is an illustration of an exemplary method of advising clients of a certificate authority trust level of a certificate authority in accordance with the techniques presented herein.

FIG. 3 presents an illustration of an exemplary first embodiment of the techniques presented herein, illustrated as an exemplary method 300 of advising clients 102 of a certificate authority trust level 210 of a certificate authority 108. The exemplary first method 300 may be implemented, e.g., as a set of instructions stored in a memory device (e.g., a memory circuit, a platter of a hard disk drive, a solid-state storage device, or a magnetic or optical disc) of a device having a processor (e.g., a server providing a certificate authority trust service 202 on behalf of a set of clients 102), where the instructions, when executed on the processor, cause the device to operate according to the techniques presented herein.

The exemplary first method 300 begins at 302 and involves executing 304 the instructions on the processor of the device. In particular, the execution of the instructions on the processor causes the device to, responsive to receiving a certificate 106 issued by the certificate authority 108 for a domain 110, evaluate 308 the certificate 106 to verify a certificate authenticity of the certificate 106. The result 310 of the evaluation 308 enables either, upon verifying the certificate authenticity 108 of the certificate 106, raising 312 the certificate authority trust level 210 of the certificate authority 108 in a certificate authority trust set 212; and upon failing to verify the certificate authenticity 108 of the certificate 106, reducing 314 the certificate authority trust level 210 of the certificate authority 108 in the certificate authority trust set 212. The exemplary method 300 also involves distributing 316 the certificate authority trust set 212 to the clients 102. In this manner, the exemplary first method 300 causes the device to advise clients 102 of the certificate authority trust levels 210 of the various certificate authorities 108 in accordance with the techniques presented herein, and so ends at 318.

Figure 4:
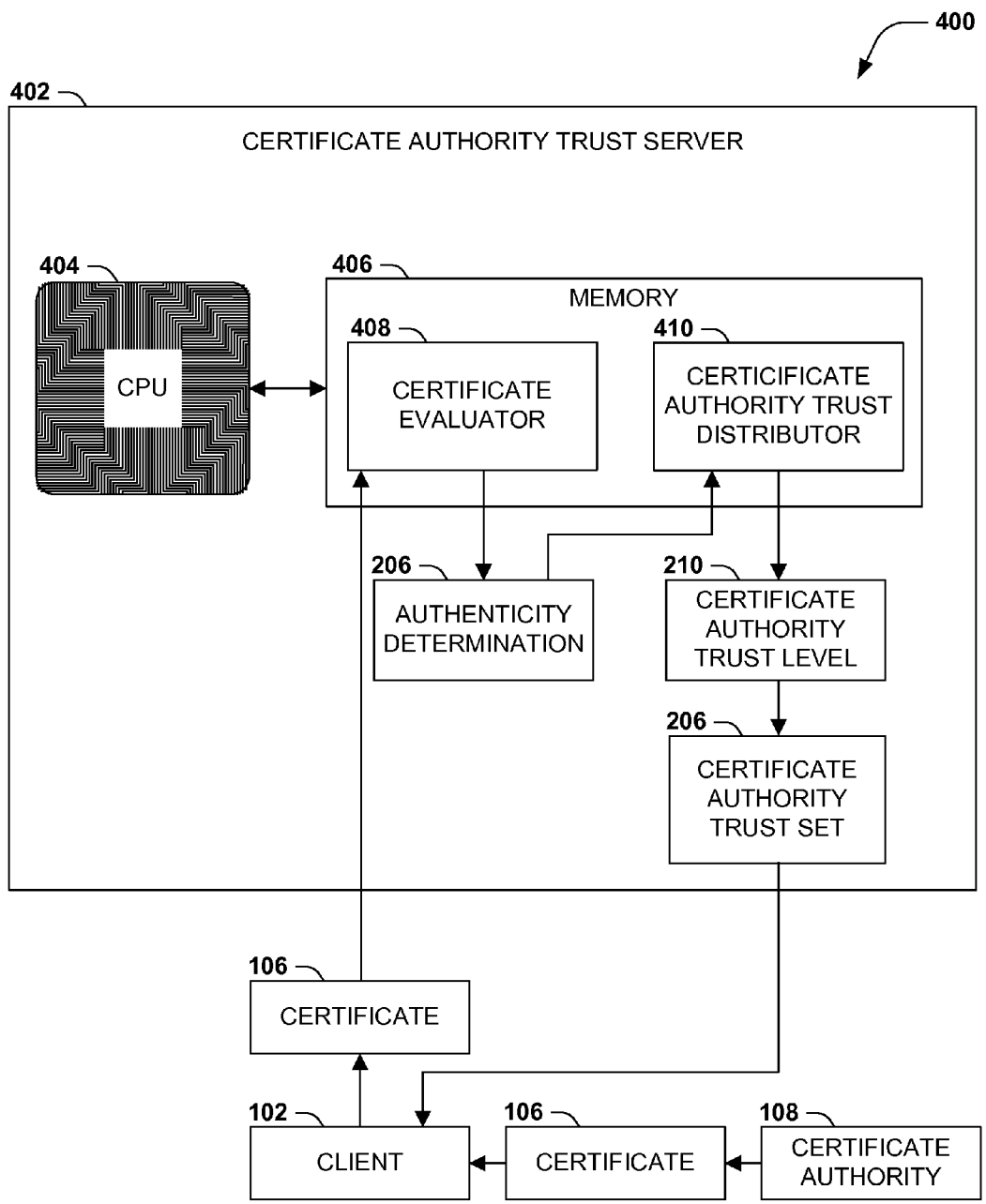
FIG. 4 is a component block diagram illustrating an exemplary certificate authority trust server for advising clients of a certificate authority trust level of a certificate authority in accordance with the techniques presented herein.

FIG. 4 presents an illustration of an exemplary second embodiment of the techniques presented herein, illustrated as an exemplary certificate authority trust server 402 that advise clients 102 of a certificate authority trust level 210 of a certificate authority 108. The server comprises a processor 404, and a memory 406 storing instructions that, when executed on the processor 404, cause the certificate authority trust server 404 to operate according to the techniques presented herein. Alternatively (though not shown), one or more components of the exemplary certificate authority trust server 402 may be implemented, e.g., as a volatile or nonvolatile logical circuit, such as a particularly designed semiconductor-on-a-chip (SoC) or a configuration of a field-programmable gate array (FPGA), that performs at least a portion of the techniques presented herein, such that the interoperation of the components completes the performance of a variant of the techniques presented herein.

In particular, the instructions stored in the memory device 406 and executed on the processor 404 implement a certificate evaluator 408, which, responsive to receiving a certificate 106 issued by the certificate authority 108 for a domain 110, evaluate the certificate 106 to verify a certificate authenticity of the certificate 106; upon verifying the certificate authenticity of the certificate 106, raises a certificate authority trust level 210 of the certificate authority 108 in a certificate authority trust set 206 stored on by the certificate authority trust server 402; and upon failing to verify the certificate authenticity of the certificate 106, reduces the certificate authority trust level 210 of the certificate authority 108 in the certificate authority trust set 206. The instructions stored in the memory device 406 and executed on the processor 404 also implement a certificate authority trust distributor 410, which distributes the certificate authority trust set 206 to the clients 102. In this manner, the exemplary certificate authority trust server 402 advises the clients 102 regarding the certificate authority trust levels 210 of respective certificate authorities 108 sin accordance with the techniques presented herein.

Figure 5:
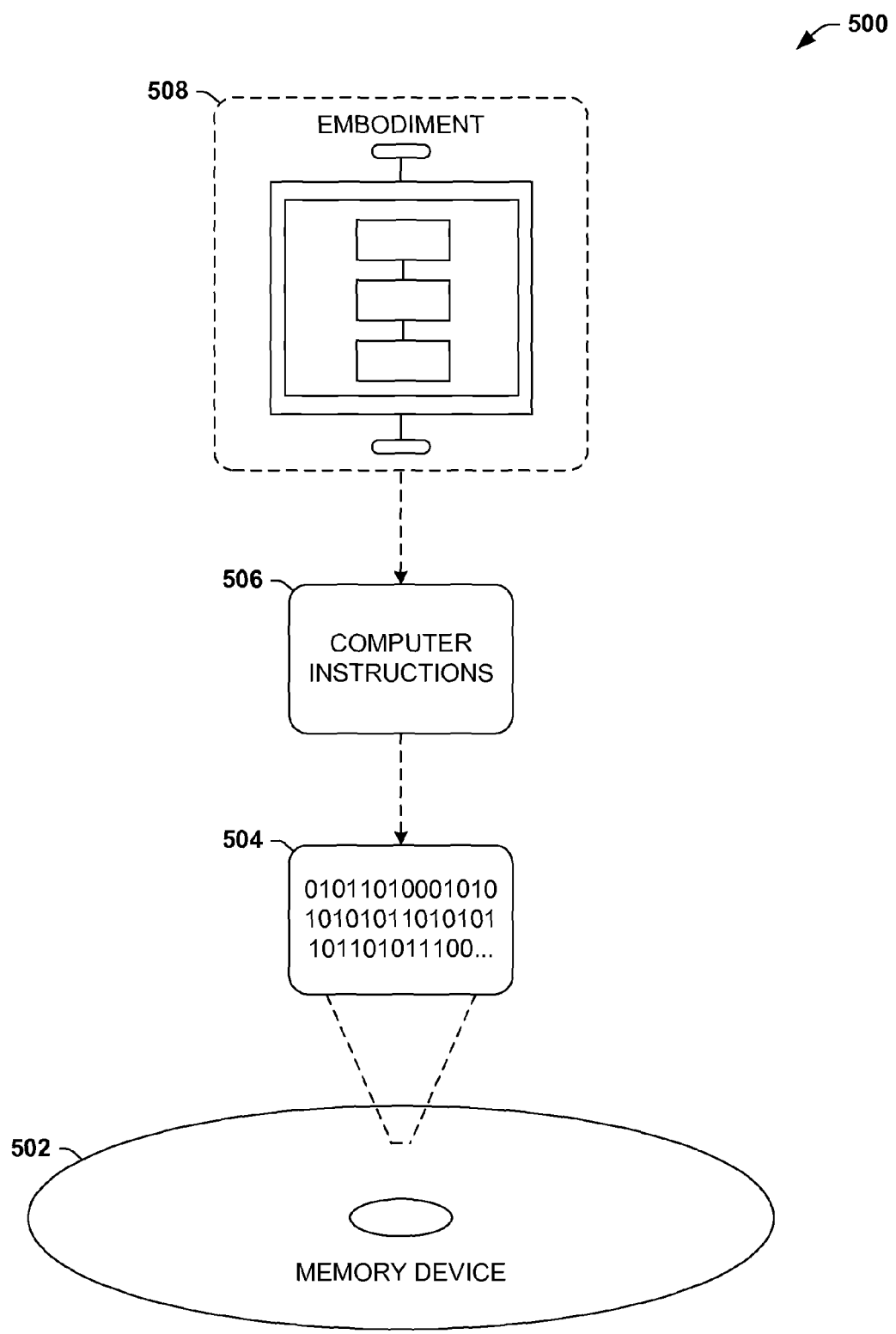
FIG. 5 is an illustration of an exemplary memory device including processor-executable instructions configured to embody one or more of the provisions set forth herein.

FIG. 5 presents an illustration of an exemplary scenario 500 featuring an exemplary memory device 502 (e.g., a CD-R, DVD-R, or a platter of a hard disk drive), on which is encoded computer-readable data 504. The computer-readable data 504 in turn comprises a set of computer instructions 506 configured to operate according to the principles set forth herein. In one such embodiment, the processor-executable instructions 506 may be configured to implement method of advising clients 102 regarding the certificate authority trust levels 210 of respective certificate authorities 108, such as the exemplary system 300 of FIG. 3. In another such embodiment, the processor-executable instructions 506 may be configured to implement a certificate authority trust server that advises clients 102 regarding the certificate authority trust levels 210 of respective certificate authorities 108, such as the exemplary certificate authority trust server 402 of FIG. 4. Many such memory devices may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary first method 300 of FIG. 3; the exemplary system 406 of FIG. 4; the exemplary second method 500 of FIG. 5; and the exemplary computer-readable storage device 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized with many types of clients 102, such as devices operated by one or more users; one or more applications executing on such devices; and/or online services provided on behalf of one or more users or other applications.

As a second variation of this first aspect, the techniques presented herein may be utilized to determine a certificate authority trust level 212 of a certificate authority 108, and therefore to authenticate various types of certificated items 104 presented to and/or accessed by a client 102, such as messages; applications; websites; and/or identifying credentials of one or more domains 110 of a network.

As a third variation of this first aspect, the techniques presented herein may be utilized to evaluate the determine a certificate authority trust level 212 of various types of certificate authorities 108 issuing certificates 106, such as the X.509 certification-based trust infrastructure.

As a fourth variation of this first aspect, many types of certificate authority trust services 202 may be provided to facilitate the evaluation by clients 102 of determine a certificate authority trust level 212 of various certificate authorities 108. Such certificate authority trust services 202 may comprise a public service provided to any client 102, or a semi-private or private service provided to a specific set of clients 102. Alternatively or additionally, a certificate authority trust service 202 may identify the certificate authority trust levels 210 of any certificate authority 108, or of only a subset of certificate authorities 108, such as those issuing particular types of certificates 106; those issuing certificates 106 only for a particular set of certificated items 104; or those interoperating on behalf of a particular set of domains 110 and/or clients 102.

As a fifth variation of this first aspect, one or more clients 102 may utilize the certificate authority trust set 212 in various ways. As a first such example, a client 102 may only permit access to certificated items 104 that are associated with a certificate 106 issued by a certificate authority 108 having a high certificate authority trust level 210 specified in the certificate authority trust set 212, and may restrict access to other certificated items 104. As a second such example, a client 102 may permit access to certificated items 104 certified by certificates 106 issued by certificate authorities 108 that are not associated with a high certificate authority trust level 210 according to the certificate authority trust set 212, but may do so only after warning a user of the certificate authority trust level 210 of the certificate authority 108, and/or may provide access within tightened security credentials (e.g., executing a first application certified by a first certificate 106 issued by a first certificate authority 108 having a high certificate authority trust level 210 natively and with a high level of privileges; and executing a second application certified by a second certificate 106 executed by a second certificate authority 108 having a low certificate authority trust level 210 with a restricted set of privileges, such as within an isolation construct, such as a virtual machine having limited access to the device of the user). These and other scenarios may be compatible with the application of the techniques presented herein.

E2. Certificate Authority Trust Set

A second aspect that may vary among embodiments of the techniques presented herein relates to the generation, use, and content of the certificate authority trust set 212 generated by the certificate authority trust service 202 and distributed to the clients 102.

As a first variation of this second aspect, the certificate authority trust set 212 may identify the certificate authority trust levels 210 assigned to the certificate authorities 108 in various ways. For example, the certificate authority trust set 212 may identify that respective certificate authorities 108 are trustworthy or untrustworthy, or may indicate a degree of trustworthiness (e.g., a percentage or letter score) for the certificate authority 108. As another example, the certificate authority trust set 212 may identify a particular certificate authority trust level 210 of the certificate authority 108 for particular types of certificates 106 and/or certificated items 104.

As a second variation of this second aspect, a certificate authority trust service 202 may determine the certificate trust levels 206 of various certificates 106, and/or the certificate authority trust levels 210 of various certificate authorities 108, in various ways. Many types of heuristics and rules may be utilized in such determinations, based on an evaluation of factors such as the content of the certificate 106, the certificated item 104 certified by the certificate 106, and the domain 110 presenting the certificate 106.

As a third variation of this second aspect, upon receiving a certificate 106 issued by a selected certificate authority 108 that does not yet have a certificate authority trust level 210 in the certificate authority trust set 212 (such as a new, newly participating, or first observed certificate authority 108), a device (such as a certificate authority trust service 202 or a client 102) may store in the certificate authority trust set 212 an untrusted certificate authority trust level for the selected certificate authority 108 (e.g., initially establishing a low determine a certificate authority trust level 212 for the certificate authority 108, until the certificate authority 108 has consistently demonstrated verifiable trustworthiness).

As a fourth variation of this second aspect, the certificate authority trust set 212 may further identify, the certificate trust levels 206 of one or more certificates 106. For example, the certificate authority trust set 212 may specify that one or more certificates 106 issued by a particular certificate authority 108 are trustworthy, or are untrustworthy (e.g., a list of certificates 106 that have been revoked by the certificate authority 108 following the discovery of a security vulnerability affecting the determine a certificate authority trust level 212 of those certificates 106). A client 102 may, upon receiving a certificate 106, determine the certificate trust level 206 of the certificate 106 specified by the certificate authority trust set 212, and evaluate the certificated item 104 according to the certificate authority trust level of the certificate authority that issued the certificate for the certificated item, and the certificate trust level of the certificate specified by the certificate authority trust set.

As a fifth variation of this second aspect, one or more clients 102 may also be configured to send to the certificate authority trust service 202 only particular types of certificates 106. As a first such example, where the certificate authority trust set 212 specifies certificate trust levels 206 for one or more certificates 106, a client 102 may be configured to submit to the certificate authority trust service 202 only certificates 106 that do not have a certificate trust level 206 in the certificate authority trust set 212 (e.g., only certificates 106 that the certificate authority trust service 202 has not yet evaluated). As a second such example, one or more clients 102 may configured to send to the certificate authority trust service 202 only certificates 106 that are associated with a publicly accessible certificated item 104 (e.g., only for publicly accessible domains). These and other variations in the generation and distribution of the certificate authority trust set may be utilized in embodiments of the techniques presented herein.

E3. Certificate Evaluation Techniques

A third aspect that may vary among embodiments of the techniques presented herein involves the heuristics used to evaluate the authenticity of the certificates 106 received from the certificate authorities 108.

As a first variation of this third aspect, a certificate 106 may be evaluated by comparison with a second certificate 106 issued by the certificate authority 108 for the domain 110. For example, two or more certificates 106 may represent irregularities, such as differently identifying the certificate authority 108 in ways that may suggest a forgery or alteration of the certificate 106.

As a second variation of this third aspect, the certificate is associated with a revocation by the certificate authority of the second certificate. As a first such example, a certificate 106 received by a client 102 from a domain 110 may have been issued by a certificate authority 108 that has subsequently issued a superseding certificate 106 for the same domain 110. As a second such example, a second certificate 106 may have been issued for a domain 110 by a certificate authority 108 while a prior first certificate issued for the same domain 110 by the same or another certificate authority 108 remains in effect and unrevoked.

As a third variation of this third aspect, certificates 106 may be received from at least one client to which the certificate 106 was transmitted by a domain 110, and may be evaluated according to a client count of clients 102 that received the certificate 106 from the domain 110. As a first such example, a certificate 106 may have been consistently received by a large body of clients 102 over a long period, and may be identified as an established certificate 106 for which the certificate authority trust level 212 is raised. As a second such example, a certificate 106 may be new, and/or may have been received only from a small number of clients 102, which may have been targeted by a compromised certificate authority trust level 212, and may therefore result in a reduction of the certificate authority trust level 212 of the certificate authority 108.

As a fourth variation of this third aspect, certificates 106 are evaluated according to a historic submission rate of the certificate 106 from the clients 102 that received the certificate 106 from the domain 110. For example, the certificate authority trust service 202 may consider the number and pattern of times that the certificate 106 has been received from clients 102, e.g., whether the certificate 106 is new, established, or expired, and whether the certificate 106 has reappeared after a lapse in submissions by clients 102.

Figure 6:
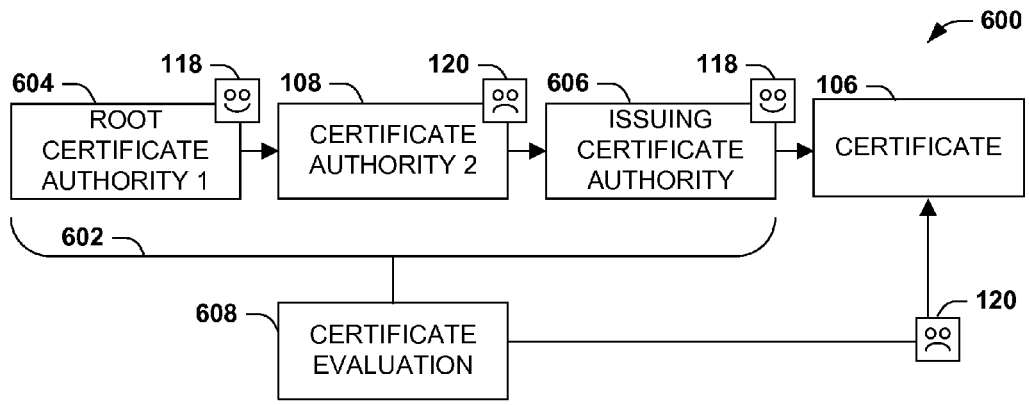
FIG. 6 is an illustration of an exemplary scenario featuring an evaluation of an authenticity of a certificate according to sequence of certificate authorities issuing the certificate in accordance with the techniques presented herein.

FIG. 6 presents an illustration of an exemplary scenario 600 featuring a fifth variation of this third aspect, wherein a certificate evaluation 210 is performed based on a certificate authority sequence 602 of certificate authorities 108 resulting in issuance of the certificate 106, beginning with a root certificate authority 604 and ending with an issuing certificate authority 606. A certificate evaluation 608 of the entire certificate authority sequence 602 of certificate authorities 108 may reveal, e.g., that while the root certificate authority 604 and the issuing certificate authority 606 demonstrate trustworthiness 118, an intermediate certificate authority 108 demonstrates an untrustworthiness 120, such as the use of a certification technique featuring a known vulnerability (e.g., a compromised encryption or hashing technique). By evaluating the respective certificate authorities 106 in the certificate authority sequence 602, the certificate evaluation 608 may correctly identify an untrustworthiness 120 of the certificate 106 in accordance with the techniques presented herein. As a first further such variation, the evaluation of the certificate authority sequence 608 may reveal an irregularity, e.g., a large certificate authorities count in the certificate authority sequence 602, or an unusual order of certificate authorities 108 in the certificate authority sequence 602. As a second further such variation, an evaluation of the certificate authorities 108 may involve an evaluation of a certificate authority type of the respective certificate authorities in the certificate authority sequence 602; e.g., if the domain 110 is from a particular geographic region that is unusual for the certificate authority 108 (such as a secured government certificate authority certifying a commercial domain or vice versa), a certificate evaluation 608 may identify it as an irregularity.

As a sixth variation of this third aspect, a certificate evaluation may involve an evaluation of a certificate scope of the certificate 106. As a first such example, the certificate scope of the certificate 106 may involve a domain count of domains for which the certificate 106 is issued by the certificate authority 108; e.g., a certificate 106 issued for an unusually large number and/or unrelated set of domains 110 may indicate a suspicious certificate 106. As a second such example, the certificate scope of the certificate 106 may involve a subdomain wildcard of the certificate 106 that applies to all subdomains of a domain 110, which may be unusual for a certificate authority 108 that typically issues per-subdomain certificates 106.

Figure 7:
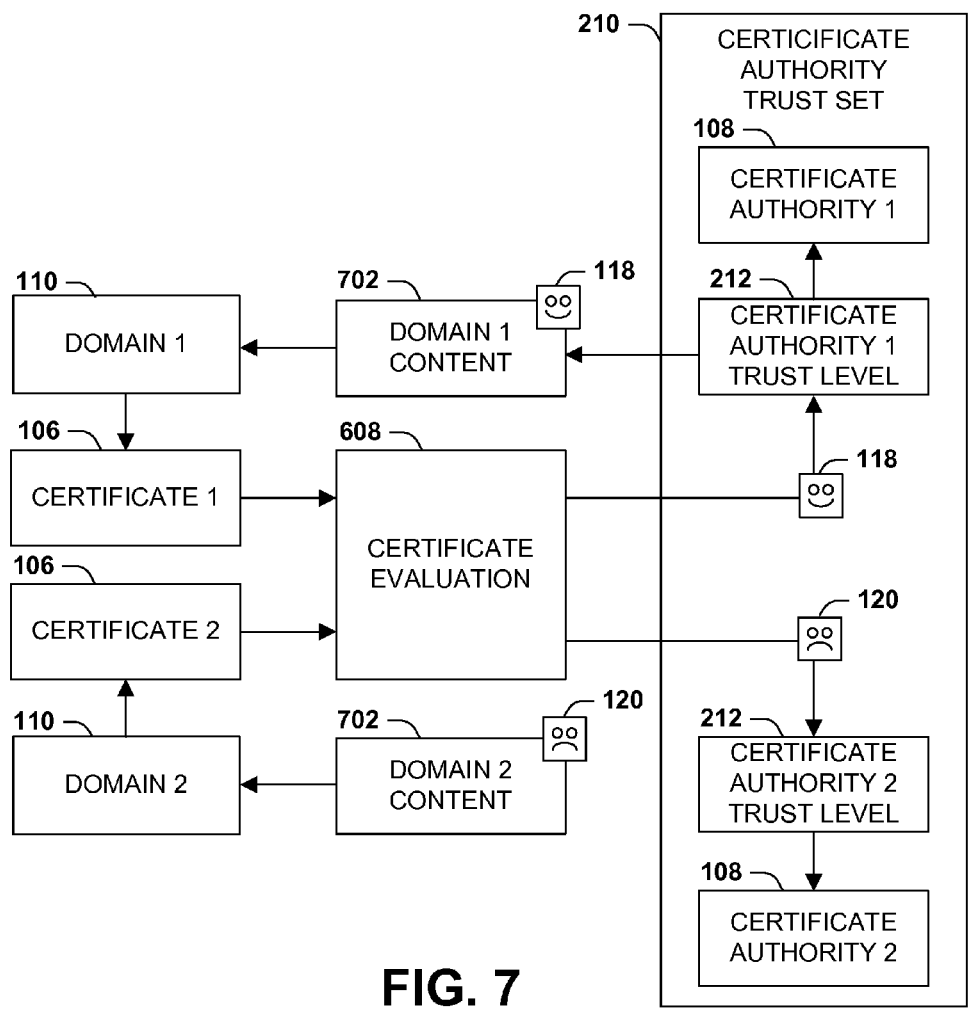
FIG. 7 is an illustration of an exemplary scenario featuring evaluation of an authenticity of a certificate according to content of the domain for which the certificate has been issued in accordance with the techniques presented herein.

FIG. 7 presents an illustration of a seventh variation of this third aspect, wherein a certificate evaluation 608 involves a determination of a domain type of the respective domains 110, and an evaluation of certificates 106 in view of the domain types of the domains 110. As a first such example, a first domain 110 may present domain content 702 that indicates trustworthiness 118, e.g., legitimate and/or harmless resources hosted by the domain 110, or a legitimate type of organization, such as an e-commerce site. A first certificate 106 submitted for the first domain 110 may be evaluated as exhibiting trustworthiness 118 that raises the certificate authority trust level 212 of the first certificate authority 108. As a second such example, a second domain 110 may present domain content 702 that indicates untrustworthiness 120, e.g., hosting suspicious content such as malware, or a suspicious type of organization, such as an online gambling site. A second certificate 106 submitted for the first domain 110 may be evaluated as exhibiting untrustworthiness 120 that reduces the certificate authority trust level 212 of the second certificate authority 108. Such content may further include, e.g., evaluating a domain name of the domain 110 to determine the domain type (e.g., determining whether the top-level domain (TLD) of the domain 110 is typically certified by this certificate authority 108), and/or by retrieving and evaluating resources hosted by the domain 110. Many such heuristics may be utilized to evaluate certificates 106 issued by certificate authorities 108 on behalf of various domains 110 in accordance with the techniques presented herein.

E4. Certification Techniques and Security Vulnerabilities

A fourth aspect that may vary among embodiments of the techniques presented herein involves the certification techniques whereby the certificates 106 are issued by the certificate authorities 108.

As a first variation of this fourth aspect, for a certificate 106 that is issued by the certificate authority 108 using a particular certification technique, an evaluation of the certificate 106 may involve evaluating a certification reliability of the certification technique used by the certificate authority 108 of the certificate 106. Upon detecting a vulnerability of a compromised certification technique, such as a detected vulnerability in a hashing algorithm or an encryption technique that some certificating authorities 108 use for certificates 106, a certificate authority trust service may advise at least one certificate authority 106 not to use the compromised certification technique to issue certificates 106, and/or may notify clients 102 not to trust any certificates 108 using the compromised certification technique. Upon determining that a certificate 106 using the compromised certification technique was issued by a selected certificate authority 108 after the selected certificate authority 108 has been advised not to use the compromised certification technique, a certification authority trust service may reduce the certificate authority trust level 212 of the certificate authority 108 in the certificate authority trust set 210.

Figure 8:
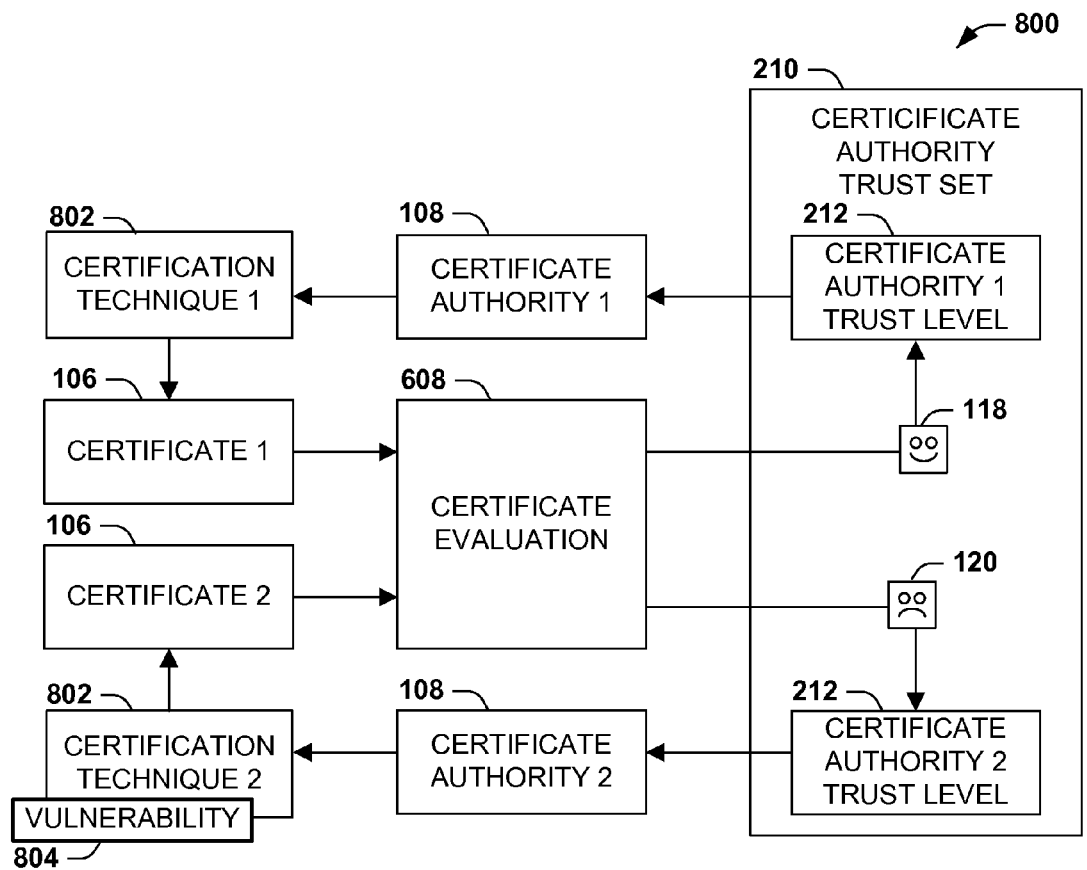
FIG. 8 is an illustration of an exemplary scenario featuring evaluation of an authenticity of a certificate according to the presence or absence of vulnerabilities in certification techniques used to generate the certificate in accordance with the techniques presented herein.

FIG. 8 presents an illustration of an exemplary scenario 800 featuring one such evaluation technique, wherein respective certificates 106 are evaluated according to a certification technique 802 that the certificate authority 108 has used to generate the certificate 106. For example, a first certificate 106 received from a first certificate authority 108 may utilize a certification technique 802 that is not known to contain a vulnerability 804, and a certification evaluation may result in a determination of trustworthiness 118 that raises the certificate authority trust level 212 of the certificate authority 108. Conversely, a second certificate 106 received from a second certificate authority 108 may utilize a certification technique 802 that is known to contain a vulnerability 804, and a certification evaluation may result in a determination of untrustworthiness 120 that reduces the certificate authority trust level 212 of the certificate authority 108 (particularly if the compromised certification technique 802 is still in use after the certification authority trust service has notified the second certificate authority 108 of the vulnerability 804). Many such considerations of the certification techniques 802 used to generate certificates 106 may be included in variations of the techniques presented herein.

F. Computing Environment

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

Figure 9:
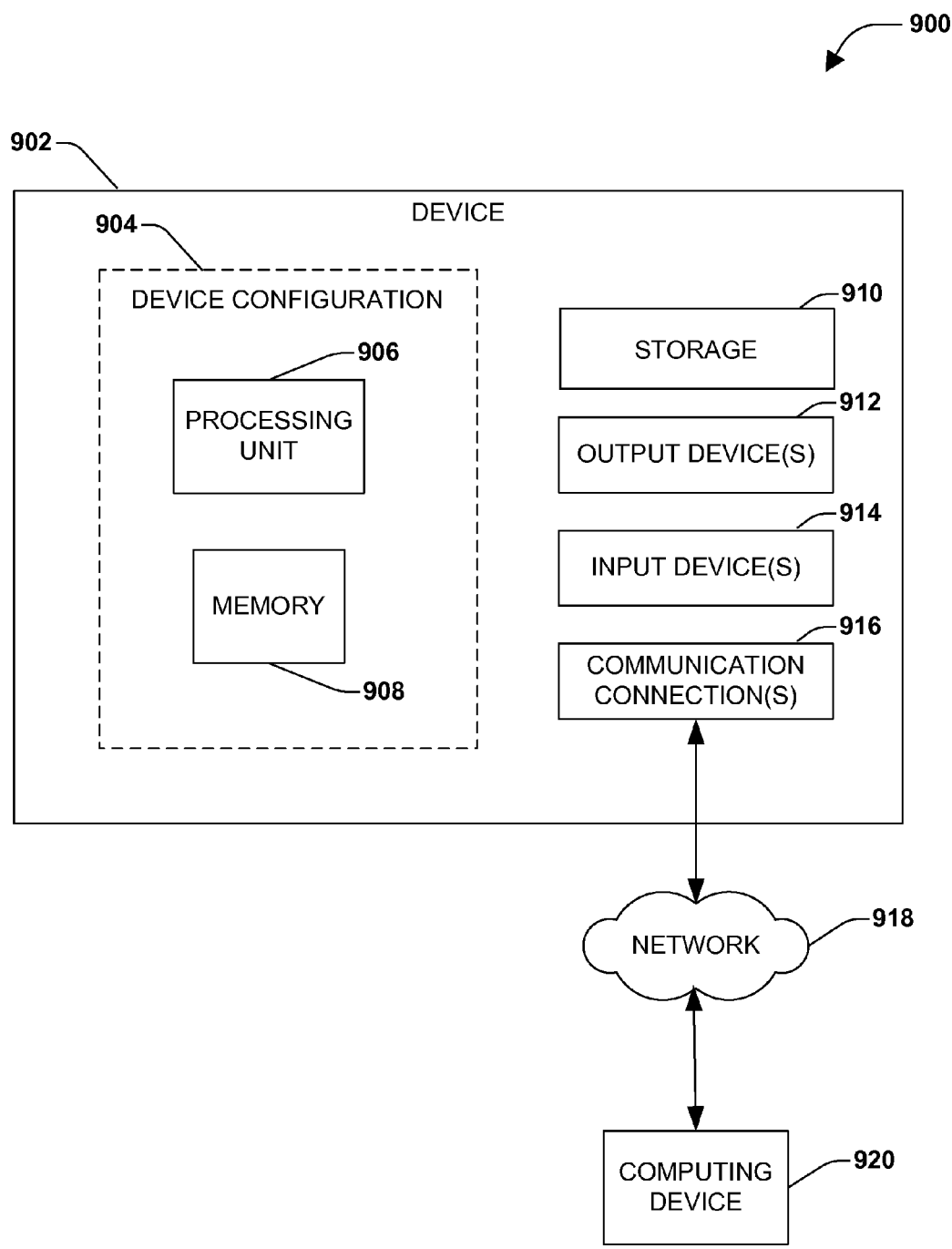
FIG. 9 is an illustration of an exemplary computing environment wherein a portion of the present techniques may be implemented and/or utilized.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer-readable instructions" being executed by one or more computing devices. Computer-readable instructions may be distributed via computer-readable media (discussed below). Computer-readable instructions may be implemented as program modules, such as functions, objects, Application Programming Interfaces (APIs), data structures, and the like, that perform particular tasks or implement particular abstract data types. Typically, the functionality of the computer-readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer-readable instructions to implement one or more embodiments provided herein may be in storage 910. Storage 910 may also store other computer-readable instructions to implement an operating system, an application program, and the like. Computer-readable instructions may be loaded in memory 908 for execution by processing unit 906, for example.

The term "computer-readable media" as used herein includes memory devices that, as a class of technology, categorically excludes electromagnetic signals and non-statutory embodiments. Such memory devices may be volatile and/or nonvolatile, removable and/or non-removable, and may involve various types of physical devices storing computer-readable instructions or other data. Examples of such memory devices include RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer-readable media" also includes communication media, as a distinct and mutually exclusive category of computer-readable media than memory devices. Communication media typically embodies computer-readable instructions or other data in a "modulated data signal" such as a carrier wave or other transport mechanism and includes any information delivery media. The term "modulated data signal" may include an electromagnetic signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer-readable instructions may be distributed across a network. For example, a computing device 920 accessible via network 918 may store computer-readable instructions to implement one or more embodiments provided herein. Computing device 902 may access computing device 920 and download a part or all of the computer-readable instructions for execution. Alternatively, computing device 902 may download pieces of the computer-readable instructions, as needed, or some instructions may be executed at computing device 902 and some at computing device 920.

G. Use of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer-readable instructions stored on one or more computer-readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of advising clients of a certificate authority trust level of a certificate authority on a device having a processor, the method comprising:
   executing on the processor instructions that cause the device to:
      responsive to receiving a certificate issued by the certificate authority for a domain:
         evaluate the certificate to verify a certificate authenticity of the certificate;
         based at least on verifying the certificate authenticity of the certificate, raise a certificate authority trust level of the certificate authority in a certificate authority trust set; and
         based at least on failing to verify the certificate authenticity of the certificate, reduce the certificate authority trust level of the certificate authority in the certificate authority trust set; and
      distribute the certificate authority trust set to the clients.

2. The method of claim 1, wherein:
   the certificate is issued by the certificate authority for a domain; and
   evaluating the certificate further comprises: comparing the certificate with a second certificate issued by the certificate authority for the domain.

3. The method of claim 2, wherein the certificate is associated with a revocation by the certificate authority of the second certificate.

4. The method of claim 1, wherein:
   the certificate is received from at least one client to which the certificate was transmitted by a domain; and
   evaluating the certificate further comprises: determining a client count of clients that received the certificate from the domain.

5. The method of claim 4, wherein evaluating the certificate to verify the certificate authenticity further comprises: evaluating a historic submission rate of the certificate from the clients that received the certificate from the domain.

6. The method of claim 1, wherein:
   the certificate is issued by a certificate authority sequence comprising at least two certificate authorities beginning with a root certificate authority; and
   evaluating the certificate to verify the certificate authenticity further comprises: evaluating the respective certificate authorities in the certificate authority sequence.

7. The method of claim 6, wherein evaluating the certificate authority sequence further comprises: evaluating a certificate authorities count of certificate authorities in the certificate authority sequence.

8. The method of claim 6, wherein evaluating the certificate authority sequence further comprises: evaluating a certificate authority type of the respective certificate authorities in the certificate authority sequence.

9. A certificate authority trust server that advise clients of a certificate authority trust level of a certificate authority, the server comprising:
   a processor;
   a memory;
   a certificate evaluator comprising instructions stored in the memory that, when executed on the processor, cause the server to, responsive to receiving a certificate issued by the certificate authority for a domain:
      evaluate the certificate to verify a certificate authenticity of the certificate;

based at least on verifying the certificate authenticity of the certificate, raise a certificate authority trust level of the certificate authority in a certificate authority trust set; and based at least on failing to verify the certificate authenticity of the certificate, reduce the certificate authority trust level of the certificate authority in the certificate authority trust set; and a certificate authority trust distributor comprising instructions stored in the memory that, when executed on the processor, cause the server to distribute the certificate authority trust set to the clients.

10. The server of claim 9, wherein the certificate evaluator evaluates the certificate to verify the certificate authenticity according to a certificate scope of the certificate.

11. The server of claim 10, wherein the certificate scope of the certificate further comprises a domain count of domains for which the certificate is issued by the certificate authority.

12. The server of claim 10, wherein the certificate scope of the certificate further comprises a subdomain wildcard of the certificate.

13. The server of claim 9, wherein:
the certificate is issued by the certificate authority on behalf of a domain; and
the certificate evaluator further evaluates the certificate to verify the certificate authenticity by:
determining a domain type of the domain; and
evaluating the certificate in view of the domain type of the domain.

14. The server of claim 13, wherein determining the domain type of the domain further comprises: evaluating a domain name of the domain name to determine the domain type.

15. The server of claim 13, wherein determining the domain type of the domain further comprises:
retrieving a resource hosted by the domain; and
determining the domain type of the domain according to the resource hosted by the domain.

16. A memory device storing instructions that, when executed on a processor of a computing device, cause the computing device to advise clients of a certificate authority trust level of a certificate authority on a device having a processor, by:
responsive to receiving a certificate issued by the certificate authority for a domain:
evaluating the certificate to verify a certificate authenticity of the certificate;
based at least on verifying the certificate authenticity of the certificate, raising a certificate authority trust level of the certificate authority in a certificate authority trust set; and
based at least on failing to verify the certificate authenticity of the certificate, reducing the certificate authority trust level of the certificate authority in the certificate authority trust set; and
distributing the certificate authority trust set to the clients.

17. The memory device of claim 16, wherein:
the certificate is issued by the certificate authority using a certification technique; and
evaluating the certificate to verify the certificate authenticity further comprises: evaluating a certification reliability of the certification technique used by the certificate authority of the certificate.

18. The memory device of claim 17, wherein executing the instructions further causes the computing device to, based at least on detecting a vulnerability of a compromised certification technique, advise at least one certificate authority not to use the compromised certification technique to issue certificates.

19. The memory device of claim 18, further comprising: based at least on determining that a certificate using the compromised certification technique was issued by a selected certificate authority after advising the selected certificate authority not to use the compromised certification technique, reduce the certificate authority trust level of the certificate authority in the certificate authority trust set.

20. The memory device of claim 18, further comprising: notifying the clients not to trust certificates using the compromised certification technique.

* * * * *